United States Patent
Norwood

(10) Patent No.: US 10,150,476 B2
(45) Date of Patent: Dec. 11, 2018

(54) METHODS AND SYSTEMS FOR CONTROLLING A VEHICLE BEING OVERTAKEN

(71) Applicant: Ford Global Technologies LLC, Dearborn, MI (US)

(72) Inventor: Andrew John Norwood, Ivanhoe (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/828,823

(22) Filed: Dec. 1, 2017

(65) Prior Publication Data

US 2018/0154894 A1 Jun. 7, 2018

(30) Foreign Application Priority Data

Dec. 7, 2016 (CN) .......................... 2016 1 1118144

(51) Int. Cl.
| | |
|---|---|
| *B60W 30/09* | (2012.01) |
| *B60W 30/095* | (2012.01) |
| *B60W 30/18* | (2012.01) |
| *B60W 30/14* | (2006.01) |
| *B60W 30/16* | (2012.01) |
| *G01S 13/93* | (2006.01) |
| *B60K 31/00* | (2006.01) |

(52) U.S. Cl.
CPC .......... *B60W 30/16* (2013.01); *G01S 13/931* (2013.01); *B60K 2031/0025* (2013.01); *B60K 2031/0033* (2013.01); *B60W 2540/20* (2013.01); *G01S 2013/9321* (2013.01)

(58) Field of Classification Search
None
See application file for complete search history.

(56) References Cited

U.S. PATENT DOCUMENTS

| | | | |
|---|---|---|---|
| 5,400,864 A | 3/1995 | Winner et al. | |
| 6,842,687 B2 | 1/2005 | Winner et al. | |
| 8,543,310 B2 | 9/2013 | Kashi et al. | |
| 2012/0290185 A1* | 11/2012 | Cooper | B61L 27/0027 701/93 |
| 2017/0082452 A1* | 3/2017 | Sumizawa | B60W 30/10 |
| 2017/0197618 A1* | 7/2017 | Ali | B60W 30/12 |
| 2017/0349172 A1* | 12/2017 | Kubota | B60W 30/09 |

FOREIGN PATENT DOCUMENTS

| | | | | |
|---|---|---|---|---|
| CN | 103359013 A | | 10/2013 | |
| CN | 104249657 A | | 12/2014 | |
| DE | 102012005245 A1 | * | 9/2012 | ............ B60W 30/16 |
| WO | WO-2013187835 A1 | * | 12/2013 | ...... B60W 30/18163 |

OTHER PUBLICATIONS

Will Knight; A Simple Wireless Technology Promises to Make Driving Much Safer.
Pedro Gomes; Making Vehicles Transparent Through V2V Video Streaming; Mar. 16, 2012.

* cited by examiner

*Primary Examiner* — Thomas G Black
*Assistant Examiner* — Demetra R Smith-Stewart
(74) *Attorney, Agent, or Firm* — Frank MacKenzie; Mohr IP Law Solutions, PC

(57) ABSTRACT

A method is provided to control a first vehicle when the first vehicle is being overtaken. The method comprises determining whether a rear vehicle is overtaking; and controlling a speed of the first vehicle when it is determined that the rear vehicle is overtaking.

17 Claims, 7 Drawing Sheets

METHODS AND SYSTEMS FOR CONTROLLING A VEHICLE BEING OVERTAKEN

RELATED APPLICATION

This application claims the benefit of Chinese Patent Application No.: CN 201611118144.2 filed on Dec. 7, 2016, the entire contents thereof being incorporated herein by reference.

FIELD

The present disclosure relates generally to methods and systems for controlling a vehicle being overtaken, in particular, it relates to controlling the vehicle being overtaken by controlling its speed.

BACKGROUND

Overtaking often happens on the road. Sometimes, a vehicle being overtaken speeds up to match the overtaking vehicle or speeds up to a greater speed than the overtaking vehicle. A driver in the vehicle being overtaken may speed up on purpose as he or she does not want to be passed or the driver may not notice that a rear vehicle is performing an overtake. The increase in speed of the vehicle being overtaken is frustrating to a driver of the overtaking vehicle. Further, the increase in speed of the vehicle being overtaken can increase the time for completion of the overtaking maneuver and thus can cause danger to the overtaking vehicle when the overtaking vehicle is passing via a lane for oncoming traffic. Thus, there exists a need for controlling the speed of the vehicle being overtaken.

SUMMARY

According to one aspect, a method is provided to control a first vehicle when the first vehicle is being overtaken. The method comprises determining whether a rear vehicle is overtaking; and controlling a speed of the first vehicle when it is determined that the rear vehicle is overtaking.

In one embodiment, the method further comprises detecting a speed and a position of the rear vehicle and a speed of the first vehicle. Whether the rear vehicle is overtaking may be determined based on the speed and the position of the rear vehicle relative to the speed and the position of the first vehicle.

In another embodiment, whether the rear vehicle is overtaking may be determined according to a signal sent by the rear vehicle.

In another embodiment, controlling the speed of the first vehicle may include controlling the speed equal to or less than a current speed.

In another embodiment, the method further comprises determining when an overtaking is completed; and resuming a previous driving operation when the overtaking is completed.

In another embodiment, the overtaking may be determined to be completed when a predetermined distance between an overtaking vehicle and the first vehicle is established.

In another embodiment, the time when the overtaking is completed may be determined based on a relative speed of the first vehicle and the overtaking vehicle and a distance between the first vehicle and an overtaking vehicle when the overtaking is initiated.

In another embodiment, the time when the overtaking is completed may be determined according to a signal sent by the overtaking vehicle.

According to another aspect, a method is provided to control a first vehicle when the first vehicle is being overtaken. The method comprises determining whether a rear vehicle is overtaking; limiting a speed of the vehicle being overtaken to a current speed if it is determined that the rear vehicle is overtaking; determining when an overtake is completed; and resuming a previous driving operation when the overtake is completed.

In one embodiment, the method further comprises detecting a speed of the first vehicle, a speed of the rear vehicle, and a distance between the first vehicle and the rear vehicle. Whether the rear vehicle is overtaking may be determined based on the detected speeds of the first vehicle and the rear vehicle. The time when the overtaking is completed may be determined based on the detected speed of the first vehicle and the rear vehicle and the distance between the first vehicle and the rear vehicle when overtaking is initiated.

In another embodiment, whether the rear vehicle is overtaking and when the overtake is completed may be determined based on signals sent by the rear vehicle that performs the overtaking.

In another embodiment, the first vehicle may include an adaptive cruise control device and the speed of the first vehicle is controlled by an adaptive cruise control device In another embodiment, the previous operation may be an operation in which a driver controls the speed of the vehicle.

In another embodiment, the previous operation may be an operation in which an adaptive cruise control is active.

According to another aspect, a vehicle control system in a first vehicle is provided to control a speed of the first vehicle when it is overtaken by a rear vehicle. The vehicle control system comprises a speed central unit; and an overtaken control unit to determine whether the rear vehicle is overtaking, instruct the speed control unit to limit a speed of the first vehicle when it is determined that the rear vehicle is an overtaking vehicle and resume a previous driving operation when overtaking is completed.

In one embodiment, the vehicle control system may further comprise an overtaking detection unit configured to detect a speed and a position of the rear vehicle, wherein the overtaken control unit determines an overtake based on a relative speed and a relative position between the first vehicle and the rear vehicle.

In another embodiment, the vehicle control system may further comprise a lane determination unit to determine a type of lanes in front of the first vehicle, wherein the overtaking is confirmed based on the types of lanes.

In another embodiment, the vehicle control system may further comprise a vehicle detection unit configured to measure a distance between the first vehicle and the overtaking vehicle. The overtaking may be determined to be completed when a predetermined distance is established between the first vehicle and the overtaking vehicle and the predetermined distance may be measured by the vehicle detection unit.

In another embodiment, the overtaken control unit may be configured to receive a signal from an overtaking vehicle to determine whether the rear vehicle is overtaking and when overtaking is completed.

In another embodiment, the speed control unit may be a cruise control device or an adaptive cruise control device.

The method and the system to control a vehicle being overtaken enable the overtaking by a rear vehicle to be completed smoothly without unnecessary delay.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed methods and system for controlling a vehicle being overtaken will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations however, for the sake of brevity, each and every contemplated variation is not individually described in the following detailed description.

Throughout the following detailed description, examples of various methods and system for controlling a vehicle being overtaken are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1A:
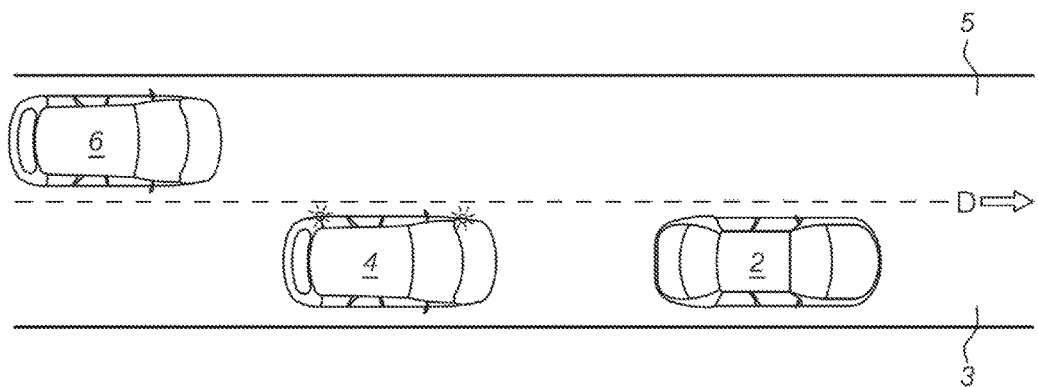
FIGS. 1A and 1B show vehicles travelling on the road and one vehicle is overtaking.
Figure 1B:
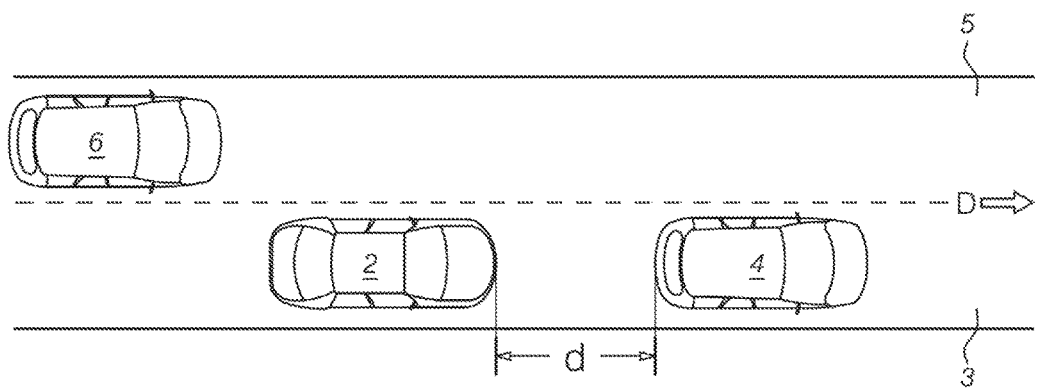

FIGS. 1A and 1B show vehicles 2, 4 and 6 travelling in the same direction D. FIG. 1A shows that vehicle 4 is travelling behind vehicle 2 on a lane 3 and vehicle 6 is travelling behind vehicle 2 on lane 5. In FIG. 1B, vehicle 4 passes or overtakes vehicle 2 and travels at a distance d ahead of vehicle 2. In the present application, vehicle 2 may be referred as a first vehicle and vehicles 4 and 6 may be referred as a rear vehicle. When vehicle 4 performs an overtake, it may be referred to as an overtaking vehicle and vehicle 2 may be referred to as a vehicle being overtaken. In some embodiments, vehicles 2, 4 and 6 may communicate with each other via a dedicated short-range communication or any other suitable communication protocols.

Figure 2:
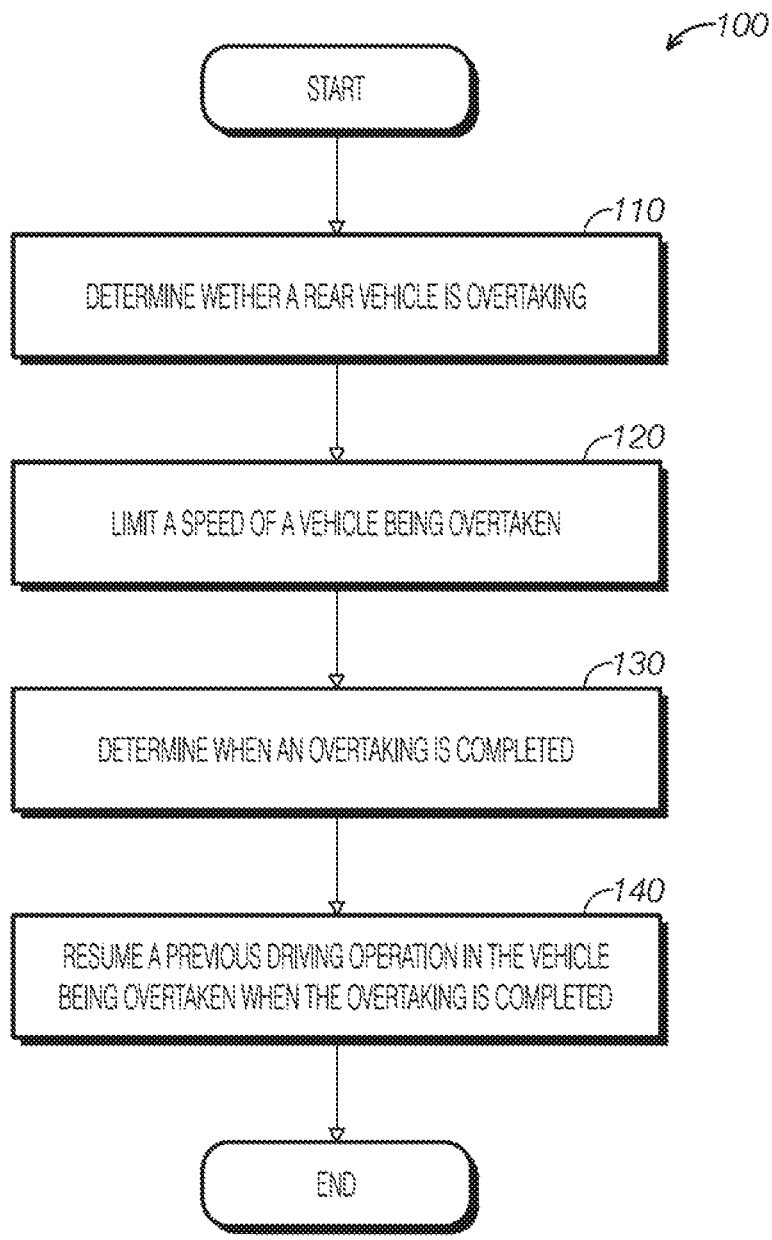
FIG. 2 shows a high-level flowchart for controlling a vehicle being overtaken.

FIG. 2 shows a high-level flowchart to illustrate a method 100 for controlling a vehicle being overtaken. The method 100 may be executed by an overtaken control system in a vehicle being overtaken. At 110, method 100 may determine whether a rear vehicle is overtaking. In some embodiments, the overtaken control system may determine whether the rear vehicle is overtaking by an overtaking detection unit provided in the vehicle being overtaken as described in detail in FIGS. 3 and 4. In some embodiments, the overtaken control system may determine whether the rear vehicle is overtaking by receiving an overtaking signal from the rear vehicle or the overtaking vehicle as described in detail in FIGS. 5-7.

If it is determined that the rear vehicle is overtaking, method 100 may limit a speed of the vehicle being overtaken at 120. In some embodiments, method 100 may limit the speed of the vehicle being overtaken to a current speed. In some embodiments, method 100 may limit the speed of the vehicle being overtaken to a specific speed. The specific speed method be less or greater than the current speed and may be determined based on the speeds of the vehicle being overtaken, the overtaking vehicle and other vehicles on the road. The speed of the vehicle being overtaken may be controlled by a speed control unit such as a cruise control device or an adaptive cruise control (ACC) device.

At 130, method 100 may determine when overtaking is completed. In some embodiments, the completion of the overtaking may be estimated by the overtaken control system based on a relative speed of the overtaking vehicle and the vehicle being overtaken and a distance between the two vehicles when the overtaking was initiated. In some embodiments, the overtaking vehicle may send a signal to inform the overtaken vehicle (e.g., vehicle 2 in FIG. 1) that the overtaking is completed. In some embodiments, the overtaking may be considered to be completed when the overtaking vehicle merges back into the lane of the vehicle being overtaken. The vehicle being overtaken may be provided with an ACC device and the ACC device is active when the overtaking is initiated. Once the overtaking vehicle drives into the lane of the vehicle being overtaken, ACC will control a safe distance between the two vehicles. In some embodiments, the overtaking may be considered to be completed when a predetermined distance or a safe distance is established between the overtaking vehicle and the vehicle being overtaken.

Next, at 140, method 100 may resume a previous driving operation after the overtake is completed. In some embodiments, the speed of the vehicle being overtaken was under driver control before the overtaking maneuver. Once the safe distance between the two vehicles is established, the speed limitation is cancelled or overridden to enable the driver control. In some embodiments, the vehicle being overtaken is under cruise control before the overtaking maneuver. Once the safe distance between the two vehicles is established, the speed limitation is cancelled and the vehicle being overtaken returns to cruise control.

Figure 3:
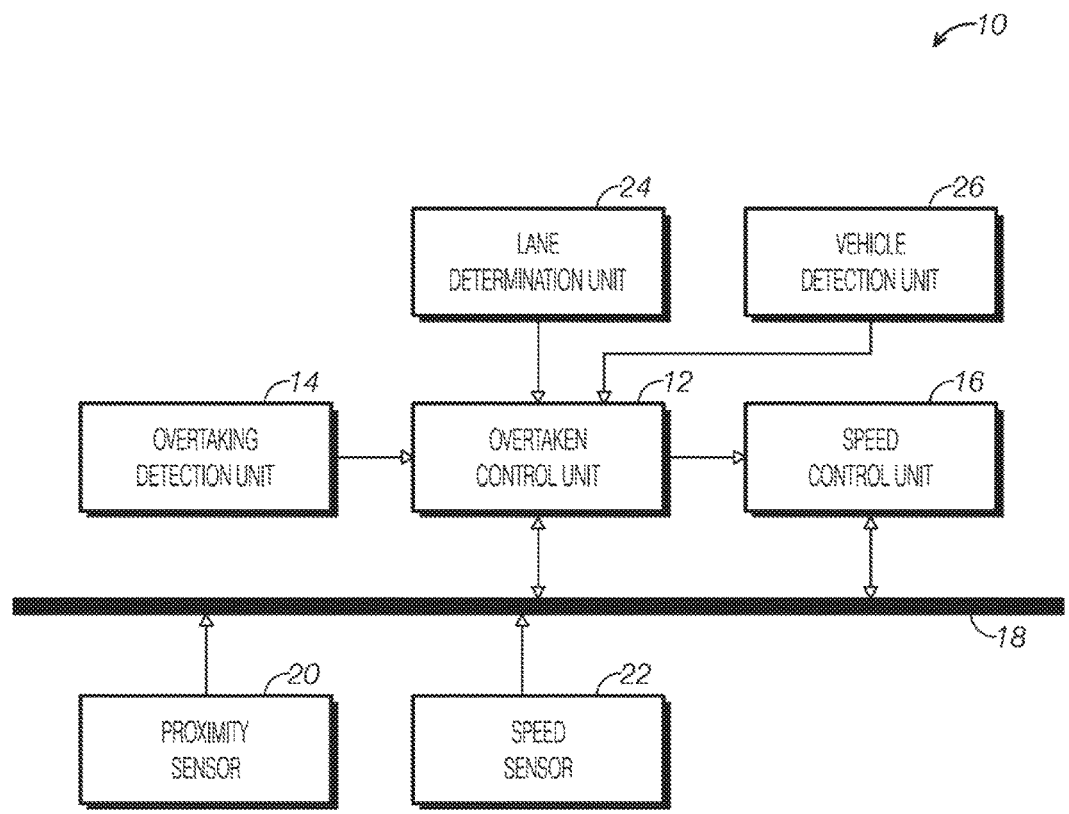
FIG. 3 is a schematic block diagram of a system for controlling a vehicle being overtaken according to one embodiment of the present disclosure.

FIG. 3 is a schematic block diagram of a system 10 for controlling a vehicle being overtaken (e.g., vehicle 2 in FIG. 1) according to one embodiment of the present disclosure and illustrates the communications between system 10 and some electronic devices of the vehicle being overtaken. System 10 may control a speed of the vehicle being overtaken so that a rear vehicle can complete the overtaking without unnecessary delay. System 10 may include an overtaken control unit 12, an overtaking detection unit 14 to detect a speed of the rear vehicle and a position of the rear vehicle and a speed control unit 16 to control the speed of the vehicle being overtaken. In some embodiments, overtaken control unit 12 may communicate with overtaking detection unit 14 and speed control unit 16 directly as illustrated in FIG. 1. In some embodiments, overtaken control unit 12 may communicate with overtaking control unit 14 and speed control unit 16 via a communication bus or a CAN bus 18 of the vehicle. Further, system 10 may include a speed sensor 22 to measure a speed of the vehicle being overtaken (e.g., vehicle 2). In some embodiments, system 10 may include a proximity sensor 20 to detect a distance between vehicle 2 and a vehicle in front of vehicle 2. The overtaken control unit 12 may communicate with proximity sensor 20 and speed sensor 22 via the CAN bus 18.

Overtaking detection unit 14 may include electronic detection devices to monitor the approaching vehicles (e.g., vehicle to the left, right and the same lane as vehicle 2). In some embodiments, the electronic devices may include a radar sensor that uses radio waves to determine the vehicle's surroundings. In some embodiments, the electronic detection devices may include cameras to capture computer-processed images. The information provided by the electronic detection devices may include a presence of the approaching vehicle in the adjacent lanes and a lane behind, a distance between the vehicle and the approaching vehicles, and a speed of the approaching vehicles, for example.

In some embodiments, the vehicle may include a blind spot information system to detect other vehicles located to the driver's side and rear using electronic detection devices and warn the driver of the approaching vehicles. Overtaken control unit 12 may communicate with the blind spot information system to receive information on the rear vehicle. In this way, no additional detection devices are required to monitor the approaching vehicles other than the blind spot information system already installed in the vehicle. It should be appreciated that overtaking detection unit 14 may be any suitable detection unit that can monitor the rear vehicle and/or approaching vehicles.

Speed control unit 16 may be a conventional speed control device in the art. In some embodiments, speed control unit 16 may include a cruise control device to control the speed of the vehicle. In some embodiments, speed control unit 16 may include an adaptive cruise control (ACC) device. The ACC device can automatically adjust speed in order to maintain a proper distance between the vehicles in the same lane. The ACC device may include a forward-looking sensor system such as radar, lidar and/or vision sensors to continuously measure the current following distance. The current following distance is transmitted to an electronic control device which intervenes in the engine controller such that the following distance (or time interval) is kept substantially constant at desired value. When the actual following distance deviates from the desired distance, the electronic control device increases or decreases the speed of the vehicle to achieve the desired distance. It should be appreciated that the ACC device may be used in hybrid vehicles and electrical vehicles.

In some embodiments, system 10 may include a lane determination unit 24 which may be a lane recognition device conventionally used in art. For example, lane determination unit 14 may include a camera attached on front portions of a ceiling of a vehicle compartment and an image recognition device. The image recognition device may recognize front information such as a three-dimensional object and type/color of road lines in front of the vehicle and output the information on types of road lines, the number of the lanes and the vehicle position to the overtaken control unit 12. Overtaken control unit 12 may determine whether the rear vehicle is travelling in an overtaking lane or the vehicles are travelling in a segment of road which allow the rear vehicle to overtake on a lane for oncoming traffic based on the information.

In some embodiments, the vehicle may include a lane keep assist system designed to alert the driver when the system detects that the vehicle is about to deviate from a traffic lane. A camera of the lane keep assist system can recognize the road structure such as white lines and yellow lines. The overtaken control unit 12 may communicate with the lane keep assist system, receive the information on the road structure, and determine the lane type that the vehicle is travelling and the adjacent line. In this configuration, no additional camera and image recognition device are required to determine the lane the vehicle is travelling other than the lane keep assist system already installed in the vehicle.

In some embodiments, system 10 may include a vehicle detection unit 26 to detect a presence of a vehicle in front and a speed and a distance of the vehicle in front (e.g., vehicle 4 when vehicle drives in front of vehicle 2 as illustrated in FIG. 1B). In some embodiments, vehicle detection unit 26 may include a radar, lidar or vision sensors.

Overtaken control unit 12 may include a processor that provides for computational resources and a memory. The overtaken control unit 12 may serve to execute instructions for software that may be loaded into the memory. The instructions may include program code, computer-usable program code, or computer-readable program code. The memory may be a storage device that is capable of storing information, such as, without limitation, data, program code in functional form, and/or other suitable information on either a temporary basis and/or a permanent basis. For example, the memory may include a random access memory or any other suitable volatile or non-volatile storage device and a persistent storage. The persistent storage may be one or more devices such as a hard drive, a flash memory, a rewritable optical disk, a rewritable magnetic tape, or some combination of the above.

Overtaken control unit 12 may determine whether the rear vehicle is overtaking based on the information from overtaking detection unit 14 and speed sensor 22. For example, overtaken control unit 12 may calculate a relative speed of vehicles 2 and 4 based on the speed of vehicle 2 measured by speed sensor 22 and the speed of vehicle 4 measured by overtaking detection unit 14. If the speed of vehicle 4 is greater than that of vehicle 2, it is indicated that vehicle 4 intends to overtake. Overtaking detection unit 14 may provide further information such as a position of vehicle 4 for the determination of overtaking. In some embodiments, overtaking detection unit 14 includes a proximity sensor to detect the distance between vehicle 2 and a rear vehicle. Overtaking detection unit may detect that vehicle 4 moves towards to lane 5 or has moved to lane 5 according to information on changes on the speeds of vehicles 2 and 4 and the distance between vehicles 2 and 4. In some embodiments, overtaking detection unit 14 includes a camera which can detect that vehicle 4 moves toward or has moved to lane 5. Further, in some embodiments, the camera may recognize a turn signal from vehicle 4. For example, a left turn signal from vehicle 4 may confirm that vehicle 4 will overtake. Similarly, overtaken control unit 12 may determine whether vehicle 6 in lane 5 (adjacent lane) is overtaking.

If it is determined that vehicle 4 is overtaking, overtaken control unit 12 may instruct speed control unit 16 to control a speed of vehicle 2 or the vehicle being overtaken. That is, the speed control of vehicle 2 is in an overtaken control mode. Overtaken control unit 12 may further determine when the overtaking is completed by estimating a time for vehicle 4 to overtake based on the relative speed between vehicles 2 and 4 and the positions between vehicles 2 and 4. After the overtaking is completed, overtaken control unit 12 may cancel the overtaken control mode and speed control is resumed to a previous driving operation or mode.

Figure 4:
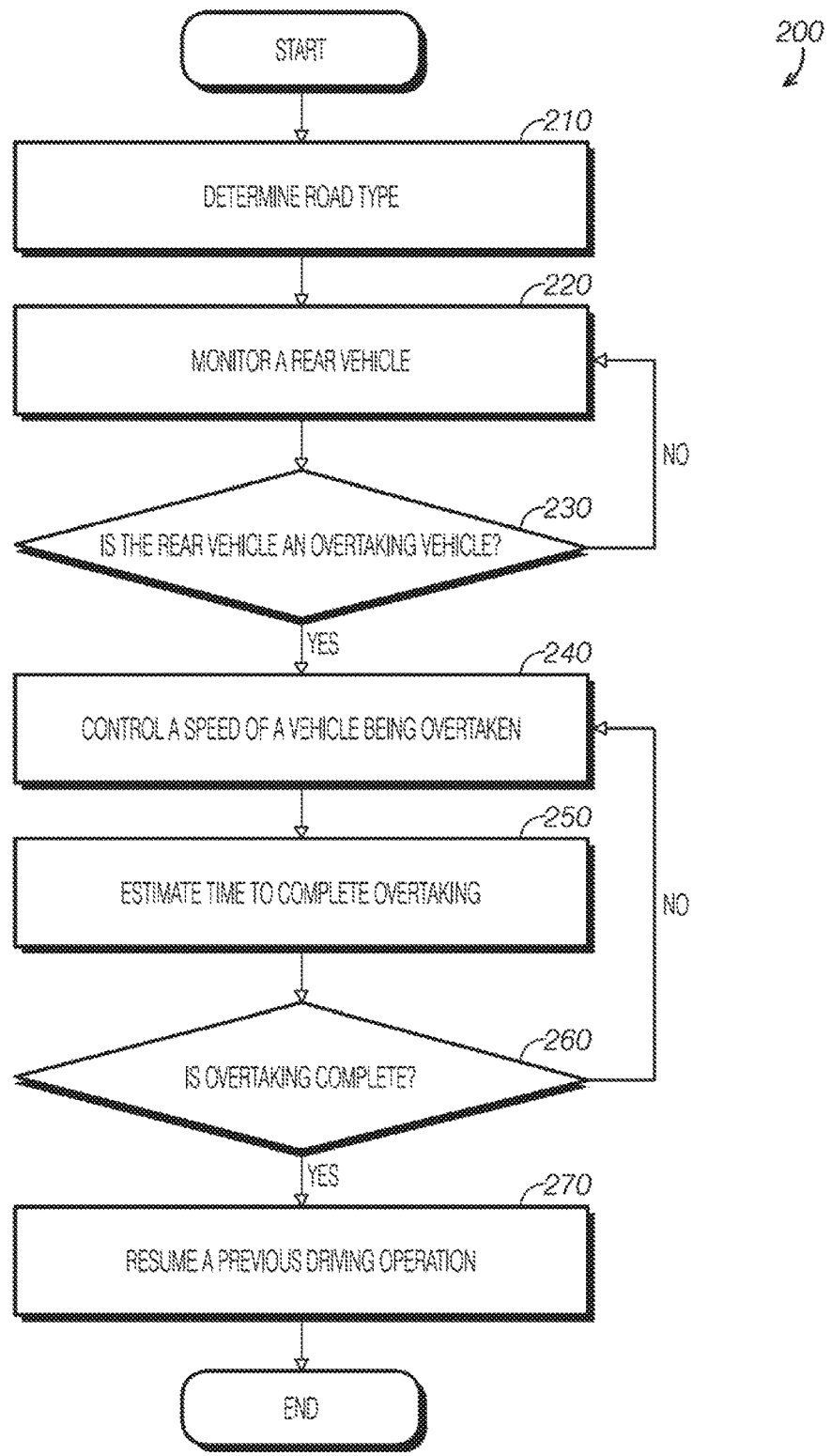
FIG. 4 shows a method for controlling the vehicle being overtaken using the system for controlling overtaking illustrated in FIG. 3.

Now referring to FIG. 4, FIG. 4 shows a method 200 for controlling the vehicle being overtaken using the system 10 as illustrated in FIG. 3. At 210, the method may determine a road type by a lane determination unit 24. Determination of the road type may confirm that the vehicle intends to overtake. For example, if the lane which the rear vehicle drives toward is an overtaking lane or a temporary overtaking lane (e.g., a lane for oncoming traffic), it can be confirmed that the rear vehicle is overtaking. At 220, method 200 may include monitoring a rear vehicle. The rear vehicle may be monitored by overtaking detection unit 14. As described above, in some embodiments, overtaking detection unit 14 may detect a speed and a position of the rear vehicle. In some embodiments, overtaking detection unit 14 may capture an image of the rear vehicle to determine its speed and position and/or an image of turn signal.

At 230, method 200 may determine whether the rear vehicle is overtaking or the overtaking maneuver is in progress. For example, overtaken control unit 12 may calculate a relative speed of vehicle 2 and vehicle 4. A faster speed of vehicle 4 (i.e., the rear vehicle) may indicate an overtaking maneuver is in progress. A change of the relative positions of vehicles 2 and 4 along with the speed data of two vehicles can confirm overtaking. In some embodiments, a camera system in the overtaken control system may capture the movement of the vehicle 4 such as changing a lane and confirm the overtaking. If the answer at step 230 is no, method 200 returns to step 220. If the answer at step 230 is yes, method 200 continues to 240 where method may control a speed of the vehicle being overtaken (i.e., vehicle 2 in the example of FIG. 1). The speed of vehicle 2 may be controlled by a speed control device such as a cruise control device or an adaptive cruise control (ACC) device. That is, vehicle 2 is operated in an overtaken control mode. In some embodiments, the speed of vehicle 2 may be controlled to a current speed when the overtaking is detected. In some embodiments, the speed of vehicle 2 may be controlled to a specific speed which is determined based on the speeds of vehicles 2 and 4 as well as a distance between vehicles 2 and 4 when the overtaking is initiated. The specific speed may be less or greater than the current speed.

Next, at 250, method 200 may include estimating time to complete overtaking or an overtaking event. In some embodiments, the estimation may be based on the controlled speed of vehicle 2 and a speed of vehicle 4 as well as a distance between vehicles 2 and 4 when the overtaking is initiated. In some embodiments, a camera in lane determination unit 24 in vehicle 2 (forward-looking camera) may capture an image of vehicle 4 (i.e., the overtaking vehicle). Overtaken control unit 12 may identify vehicle 4 by comparing with the image captured by a camera1 in overtaking detection unit 14 (backward-look camera) and determine whether the overtaking is completed.

At 260, method 200 may determine if the overtaking is completed based on the estimated time or the camera information. In some embodiments, the overtaking may be considered to be completed when the overtaking vehicle merges into the lane of the vehicle being overtaken. In some embodiments, the overtaking may be considered to be completed when a predetermined distance or a safe distance is established between the overtaking vehicle and the vehicle being overtaken. If the overtaking is not completed, method 200 returns to 240. If the overtaking is completed, method 200 continues to 270. At 270, method 200 may resume a previous driving operation. That is, the overtaken speed control is cancelled. In some embodiments, the vehicle being overtaken includes an ACC device, the ACC device resumes its normal operation of varying the speed to maintain a predetermined distance when the ACC mode is active prior to the overtaking event. If the ACC mode is not active prior to the overtaking event, the speed control resumes the driving operation where the driver controls the speed.

Figure 5:
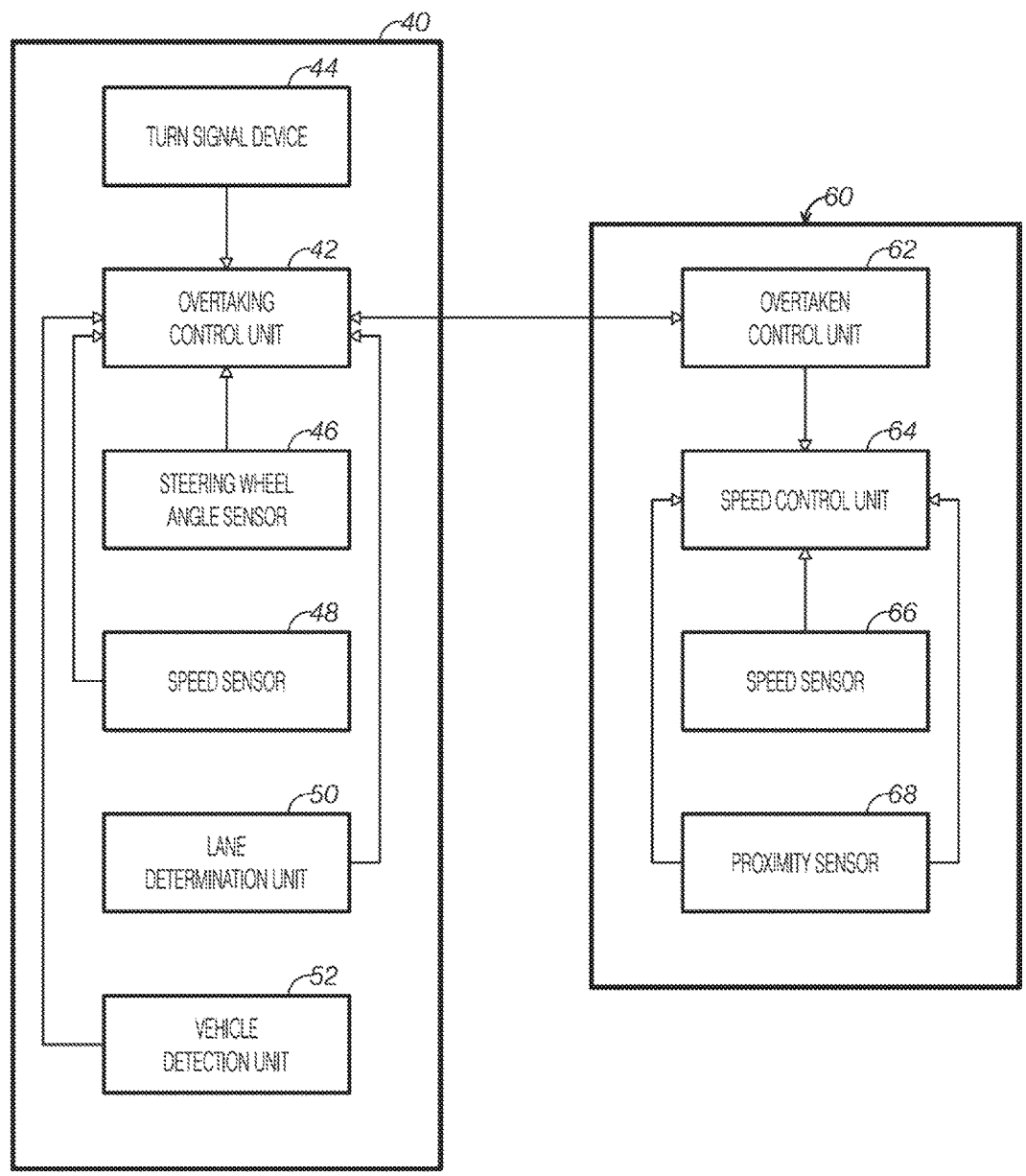
FIG. 5 is a schematic block diagram of a system for controlling a vehicle being overtaken according to another embodiment of the present disclosure.

FIG. 5 is a schematic block diagram of an overtaking control system 40 for an overtaking vehicle and an overtaken control system 60 for controlling a vehicle being overtaken according to one embodiment of the present disclosure. The overtaking control vehicle may be vehicle 4 and the vehicle being overtaken may be vehicle 2 illustrated in FIGS. 1A and 1B. Overtaking control system 40 in vehicle 4 or a rear vehicle may include an overtaking control unit 42 and a plurality of sensors or detection units. Overtaking control unit 42 may determine whether vehicle 4 is overtaking or whether the overtaking is in progress based on information from one or more sensors. In some embodiments, overtaking control system 40 may include at least one of a turn signal device 44, a steering wheel angle sensor 46, a speed sensor 48 that measures a speed of vehicle 4, a lane determination unit 50 and a vehicle detection unit 52. Lane determination unit 50 may determine a road type and/or an overtaking lane. In some embodiments, lane determination unit 50 may be a forward-mounted camera to capture an image in front of vehicle 4. Vehicle detection unit 52 may detect a presence of a vehicle in front and a speed and a distance of the vehicle in front (e.g., vehicle 2 in FIGS. 1A and 1B). In some embodiments, vehicle detection unit 52 may include a radar, lidar or vision sensors.

Overtaking control unit 42 may determine that vehicle 4 intends to overtake based on the relative speed between vehicle 2 and vehicle 4 and based on a lane type of the road. In one example, when the speed of vehicle 4 is greater than the speed of vehicle 2 and vehicle 4 is on the same lane as vehicle 2, overtaking control unit 42 may confirm that vehicle 4 intends to perform the overtaking when turn signal device 44 or steering wheel angle sensor 46 is activated. After the confirmation, overtaking control unit 42 may send an overtaking signal to vehicle 2. In another example, when the speed of vehicle 4 is greater than the speed of vehicle 2 and vehicle 4 is on an adjacent lane to vehicle 2 (e.g., on a multi-lane freeway), overtaking control unit 42 may determine that vehicle 4 intends to overtake vehicle 2. In some embodiments, overtaking control unit 42 may send an overtaking signal to vehicle 2 after vehicle 4 has reached a minimum allowable distance to vehicle 2. The minimum allowable distance may be a distance that an overtaking vehicle is close enough to initiate an overtake so that the disruption to the vehicle being overtaken is minimized.

Overtaking control unit 42 may estimate the time when the overtaking has been completed based on the speed of vehicles 2 and 4 and distance between vehicles 2 and 4. Additionally or alternatively, completion of the overtaking may be determined based on the on/off status of a turn signal and/or a change in the steering wheel angle and or the images captured by the overtaking vehicle during the overtaking process.

Now, turning to overtaken control system 60 in the vehicle being overtaken (e.g., vehicle 2), overtaken control system 60 may include an overtaken control unit 62, a speed control unit 64, a speed sensor 66 that measures the speed of vehicle 2 and a proximity sensor 68 that detects a distance between vehicle 2 and a vehicle that is overtaking (e.g., vehicle 4 in FIG. 1B). Speed control unit 4 may be a conventional speed control device in the art. Speed sensor 66 may provide information to the speed control unit 64 so that the speed can be adjusted based on the current speed. In some embodiments, proximity sensor 68 may provide information to speed control unit 64 so that a distance between vehicles may be maintained according to the information on the current speed and the current distance. In some embodiments, speed control unit 64 may include a cruise control device to control the speed of the vehicle. In some embodiments, speed control unit 64 may include an adaptive cruise control (ACC) device. Speed sensor 66 and proximity sensor 68 may be provided in the ACC device. In some embodiments, the proximity sensor 68 may be communicated with overtaking control unit 62 to further confirm completion of an overtaking event.

Vehicles 2 and 4 may communicate with each other via any suitable vehicle to vehicle communication mechanism or protocol. In some embodiments, vehicles 2 and 4 may communicate with each other via a dedicated short-range communication protocol. Overtaken control unit 62 may receive information or signal from overtaking control unit 42 of vehicle 4 notifying that overtaking is in process. Once the signal is received, overtaken control unit 62 may instruct speed control unit 64 to limit a speed to a specific value. Overtaken control unit 62 may further receive a signal from overtaking control unit 42 that the overtaking has completed. After being informed of the completion of the overtaking, overtaking control unit 42 may instruct speed control unit 64 to resume a previous driving operation.

It should be appreciated that a vehicle may include both the overtaking control system 40 and the overtaken control system 60. The overtaking control system is activated when the vehicle performs the overtaking and communicates with a vehicle being overtaken. The overtaken control system is activated when the vehicle is being overtaken and controls the speed of the vehicle based on the status of overtaking according to a signal from the overtaking vehicle.

Figure 6:
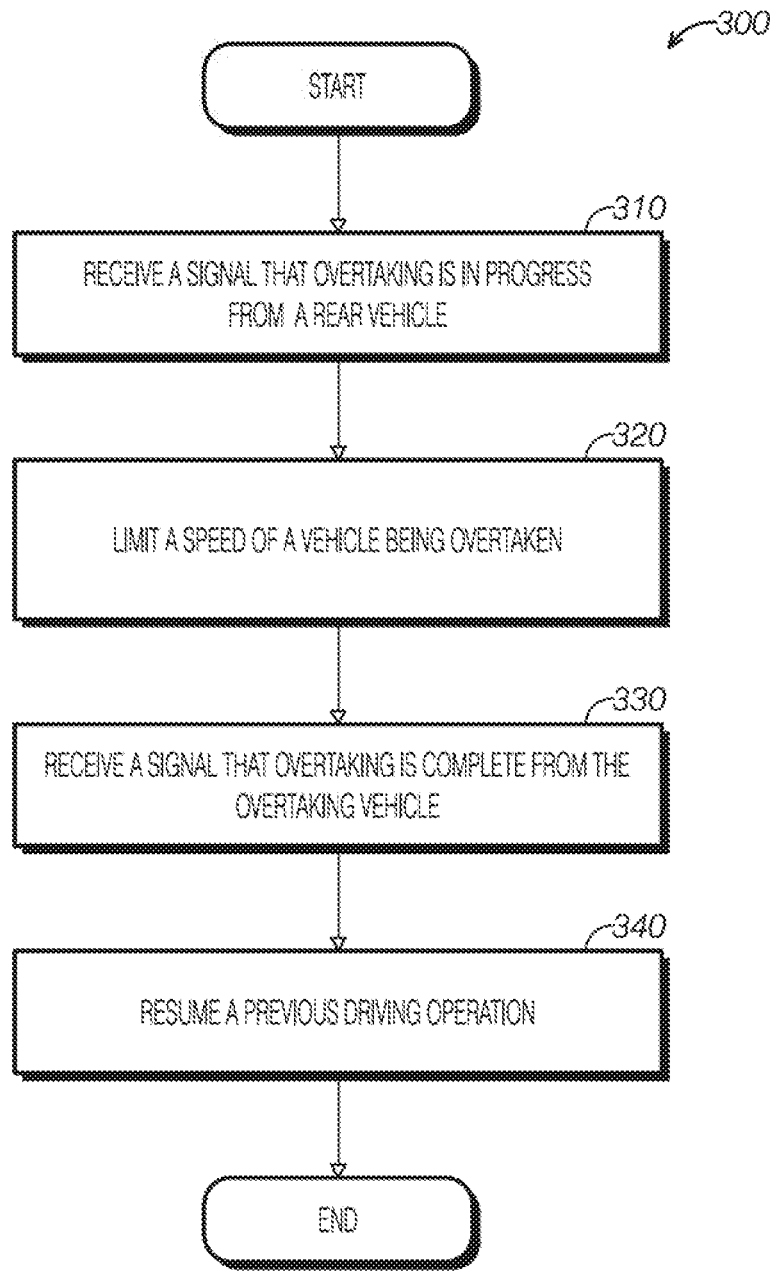
FIG. 6 shows a method for controlling the vehicle being overtaken, which is implemented by the system for controlling the overtaking illustrated in FIG. 5.

FIG. 6 shows a method 300 for controlling the vehicle being overtaken, which is implemented by an overtaken control system illustrated in FIG. 5. The vehicle being overtaken may be vehicle 2 illustrated in FIGS. 1A and 1B. Vehicle 2 may communicate with a rear vehicle such as vehicles 4 and 6 via any suitable communication protocol. Method 300 may control a speed of vehicle being overtaken via based on the information on an overtaking event from the overtaking vehicle via the vehicle-vehicle communication. At 310, method 300 may include receiving a signal that an overtake is in progress by an overtaken control system from a rear vehicle. The overtaken control system may be the overtaken control system 60 in vehicle 2 and the rear vehicle may be vehicle 4. At 320, method 300 may include limiting a speed of a vehicle being overtaken (e.g., vehicle 2). That is, vehicle 2 is operated at an overtaken control mode. The speed of vehicle 2 may be limited by a speed control unit 64. In some embodiments, the speed may be limited to a current speed, that is, the speed when vehicle 2 receives the overtaking signal. In some embodiments, the speed may be limited to a specific speed set up by the overtaken control unit based on a relative speed of vehicles 2 and 4 and a distance between vehicles 2 and 4. The specific speed controlled during the overtaking process may be greater, less than or equal to the current speed of vehicle 2.

At 330, method 300 may include receiving a signal that the overtaking is completed from the overtaking vehicle (e.g., vehicle 4). In some embodiments, the overtaking may be considered to be completed when the overtaking vehicle merges into the lane of the vehicle being overtaken. In some embodiments, the overtaking may be considered to be completed when a predetermined distance or a safe distance is established between the overtaking vehicle and the vehicle being overtaken. The distance between vehicle 2 and vehicle 4 may be measured by a proximity sensor 68 of vehicle 2 and the distance information is input to overtaken control unit 62.

Next, at 340, method 300 may resume a previous driving operation after the predetermined distance is established. In some embodiments, the vehicle speed was under driver control before the overtaking maneuver. Once the predetermined distance between the two vehicles is established, the speed limitation is cancelled or the overtaken control mode is stopped to return the speed to the driver control. In some embodiments, the vehicle is under cruise control before the overtaking maneuver. Once the safe distance between the two vehicles is established, the overtaken speed mode is switched to the previous cruise control.

Figure 7:
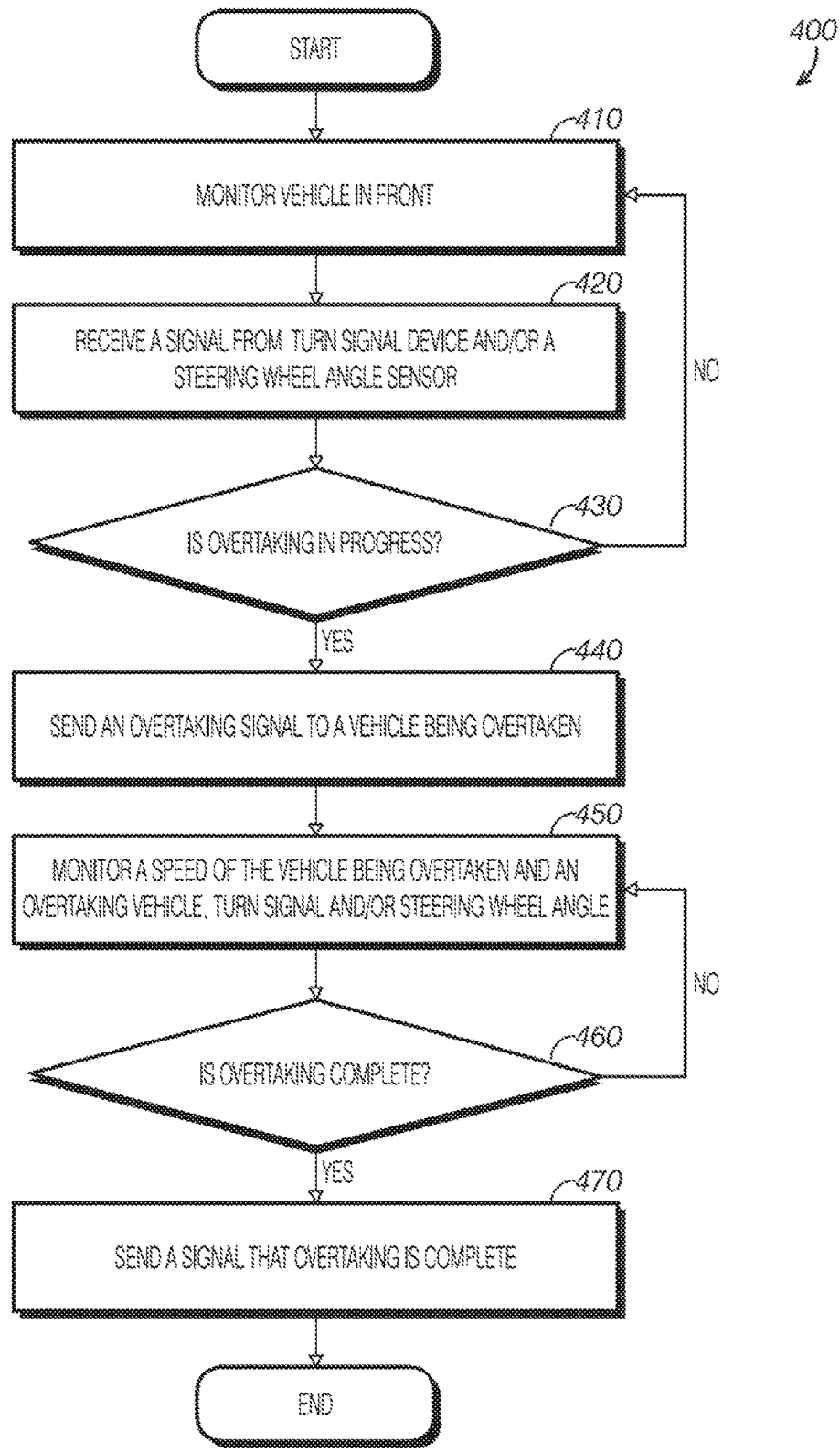
FIG. 7 shows a method for controlling an overtaking vehicle, which is implemented by the system for controlling the overtaking illustrated in FIG. 5.

FIG. 7 shows a method 400 for an overtaking controlling method for vehicle 4, which is implemented by an overtaking control system 40 of vehicle 4 illustrated in FIG. 5. Method 400 may communicate with a vehicle in front (e.g., vehicle 2) and send the information on the overtaking to vehicle 2. At 410, method 400 may monitor the vehicle in front (e.g., vehicle 2). Vehicle detection unit 52 may detect a presence and a speed of vehicle 2 and a distance between vehicles 2 and 4. At 420, method 400 may receive a signal from a turn signal device 44 and/or a steering wheel angle sensor 46. At 430, method 400 may determine whether overtaking is in progress. In some embodiments, method 400 may determine that vehicle 4 intends to overtake when it determines that a speed of vehicle 4 is greater than a speed of vehicle 2 and a turn signal or a steering wheel angle is directed towards an adjacent lane that allows overtaking. If not, method 400 returns to step 410. If yes, method 400 continues to step 440 where method 400 includes sending an overtaking signal to a vehicle being overtaken (i.e., vehicle 2). In some embodiments, an overtaking signal may be sent after vehicle 4 has reached a minimum allowable distance to the vehicle being overtaken. The minimum allowable distance may be a distance that an overtaking vehicle is close enough to initiate an overtake so that the disruption to the normal operation of the vehicle being overtaken is minimized. At 450, method 400 may monitor a speed of the vehicle being overtaken (e.g., vehicle 2) and the overtaking vehicle (e.g., vehicle 4), turn signal and/or steering wheel angle.

Next, method 400 may determine whether the overtaking is completed at 460. In some embodiments, overtaking control unit 42 may estimate a time to complete the overtaking based on speeds of vehicle 2 and vehicle 4 and a distance when the overtaking is initiated. In some embodiments, overtaking control unit 42 may determine the time when the overtaking is completed based on a turn signal switching on and off or a change in steering wheel angle. In some embodiments, overtaking control unit 42 may estimate the time to complete the overtaking and confirm the overtaking according to the turn signal and the steering wheel angle. Further, the overtaking control unit may receive information on the road from the vehicle detection unit and further confirm the completion of the overtaking. Once the overtaking is determined to be completed, method 400 may send a signal to vehicle 2 to notify the completion of the overtaking.

The system and method of the present application control a speed a vehicle being overtaken and thus enable an overtaking event to be completed without delay caused by the vehicle being overtaken. Further, the system and method allow a safe distance to be established before resuming to a previous driving operation.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for controlling a first vehicle when the first vehicle is being overtaken by a rear vehicle, the method comprising:
    detecting a speed and a position of the rear vehicle traveling in a same lane as the first vehicle by an overtaking detection unit, and a speed of the first vehicle by a speed sensor in the first vehicle;
    determining whether the rear vehicle is overtaking based on the speed of the first vehicle, the speed of the rear vehicle and a distance between the first vehicle and the rear vehicle by an overtaken control unit in the first vehicle; and
    controlling a speed of the first vehicle when it is determined that the rear vehicle is overtaking.

2. The method of claim 1, wherein controlling the speed of the first vehicle includes controlling the speed equal to or less than a current speed.

3. The method of claim 1, further comprising determining when overtaking is completed; and resuming a previous driving operation when the overtaking is completed.

4. The method of claim 3, wherein the overtaking is determined to be completed when a predetermined distance between an overtaking vehicle and the first vehicle is established.

5. The method of claim 4, wherein, the time when the overtaking is completed is determined based on a relative speed of the first vehicle and the overtaking vehicle and a distance between the first vehicle and an overtaking vehicle when the overtaking is initiated.

6. The method of claim 1, wherein the overtaking detection unit includes a camera to detect a movement of the rear vehicle and recognize a turn signal from the rear vehicle and whether the rear vehicle is overtaking is further determined based on the turn signal from the rear vehicle.

7. A method for controlling a first vehicle when the first vehicle is being overtaken, comprising:
    detecting a speed of the first vehicle, a speed of a rear vehicle immediately behind the first vehicle and in a same lane as the first vehicle travels, and a distance between the first vehicle and the rear vehicle by an overtaking detection unit in the first vehicle;
    determining whether a rear vehicle is overtaking based on the speed of the first vehicle, the speed of the rear vehicle and the distance between the first vehicle and the rear vehicle by an overtaken control unit located in the first vehicle;
    limiting a speed of the vehicle being overtaken to a current speed if it is determined that the rear vehicle is overtaking;
    determine when an overtaking is completed; and
    resuming a previous driving operation when the overtaking is completed.

8. The method of claim 7, wherein when the overtaking is completed is determined based on the detected speed of the first vehicle and the rear vehicle and the distance between the first vehicle and the rear vehicle when an overtaking is initiated.

9. The method of claim 7, wherein the first vehicle includes an adaptive cruise control device and the speed of the first vehicle is controlled by the adaptive cruise control device.

10. The method of claim 9, wherein the previous operation is an operation in which a driver controls the speed of the vehicle.

11. The method of claim 10, wherein the previous operation is an operation in which an adaptive cruise control is active.

12. The method of claim 7, wherein the overtaking detection unit includes a camera to detect a movement of the rear vehicle and recognize a turn signal from the rear vehicle and whether the rear vehicle is overtaking is further determined based on the turn signal from the rear vehicle.

13. A vehicle control system in a first vehicle to control a speed of the first vehicle when it is overtaken by a rear vehicle, comprising:
    a speed control unit;
    an overtaking detection unit located in the first vehicle and configured to detect a speed and a position of the rear vehicle; and
    an overtaken control unit in the first vehicle to determine whether the rear vehicle is overtaking based on the speed and the position of the rear vehicle, instruct the speed control unit to limit a speed of the first vehicle when it is determined that the rear vehicle is an overtaking vehicle and resume a previous driving operation when an overtaking is completed, wherein the rear vehicle is driving immediately behind the first vehicle and in a same lane as the first vehicle.

14. The vehicle control system of claim 13, further comprising a lane determination unit to determine a type of lanes in front of the first vehicle, wherein the overtaking is confirmed based on the types of lanes.

15. The vehicle control system of claim 14, further comprising a vehicle detection unit configured to measure a distance between the first vehicle and the overtaking vehicle, wherein the overtaking is determined to be completed when a predetermined distance is established between the first vehicle and the overtaking vehicle and the predetermined distance is measured by the vehicle detection unit.

16. The vehicle control system of claim 13, wherein the speed control unit is a cruise control device or an adaptive cruise control device.

17. The vehicle control system of claim 13, wherein the overtaking detection unit includes a camera to detect a movement of the rear vehicle and recognize a turn signal from the rear vehicle and whether the rear vehicle is overtaking is further determined based on the turn signal from the rear vehicle.

* * * * *